Dec. 20, 1927.
W. R. JOHNSON ET AL
1,653,212
HANDPIECE
Filed Dec. 21, 1925
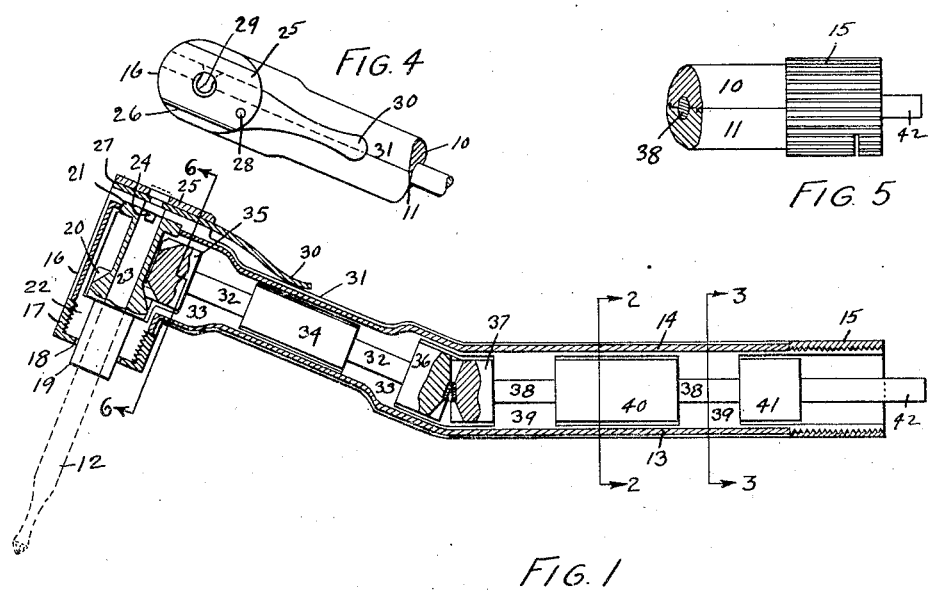
FIG. 4
FIG. 5
FIG. 1
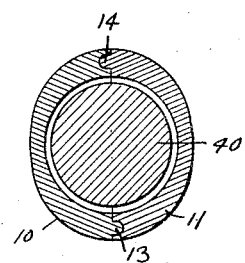
FIG. 2
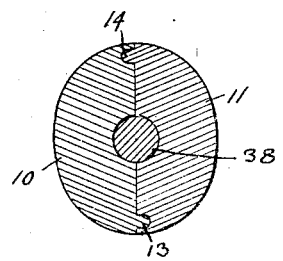
FIG. 3
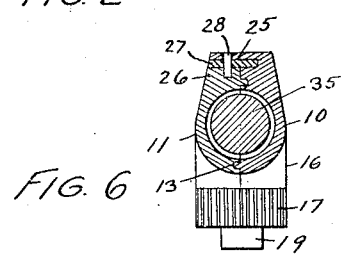
FIG. 6
INVENTORS
W. R. JOHNSON
A. C. CANFIELD
BY E. B. Birkenbeuel
THEIR ATTORNEY Patented Dec. 20, 1927.

1,653,212

UNITED STATES PATENT OFFICE.

WALTER R. JOHNSON AND ALFRED C. CANFIELD, OF PORTLAND, OREGON.

HANDPIECE.

Application filed December 21, 1925. Serial No. 76,681.

This invention relates generally to the art of dentistry, and particularly to a special form of hand piece.

The first object of this invention is to so construct the hand piece as to make it capable of being readily cleansed and sterilized.

The second object is to increase the life of the small gears employed in such articles.

The third object is to construct the hand piece in a manner that abrasives and foreign matter cannot find their way to the working parts and oil will not readily find its way outside of the tool. Also that less oil is required to properly lubricate same as no portion of the oil supplied will be absorbed by foreign matter.

The fourth object is to so construct the housing that it will be extremely rigid and free from undue noise and vibration.

These, and other objects, will become more apparent from the specification following as illustrated in the accompanying drawing, in which:

Figure 1 is an enlarged longitudinal section through the device of which Figure 2 is a transverse section taken along the line 2—2 in Figure 1 and at a still further enlarged scale. Figure 3 is a transverse section taken along the line 3—3 in Figure 1, also at an enlarged scale. Figure 4 is a plan of the burr-holding end of the hand piece, of which Figure 5 is a plan of the end to which power is applied. Figure 6 is a transverse section taken along the line 6—6 in Figure 1.

Similar numbers of reference refer to the same parts throughout the several views.

Referring in detail to the drawing, the hand piece itself has the same general shape as those now in common use but differs therefrom principally by being divided into two halves 10 and 11, the parting line being in a plane passing through the axis of the burr 12 whose position is indicated in dotted lines.

In order to insure a tight joint between the halves 10 and 11, the half 10 is provided with a tongue 13 and the half 11 is provided with a tongue 14, which tongues fit into corresponding grooves in the opposite half of the hand piece. One end of the halves 10 and 11 is provided with a threaded sleeve or cap 15 whose thread is preferably given a very slight taper.

The head 16 is provided with a cap 17 through whose opening 18 projects the burr-holding shank 19 on which is formed the pinion 20. The shank 19 extends across the head 16 and its flange 21 journals in a suitable recess between the halves of the head 16.

The shank 19 journals between the portions 22 of the head 16 and is provided with a central opening 23 which receives the burr 12. A flat spot 24 in the hole 23 engages a similar flat spot ordinarily provided on the burrs and insure their rotating with the shank 19.

The half 10 is provided with an overhanging top 25 which, when the halves 10 and 11 are assembled, forms a slot with the portion 26 of the member 11. In this slot is placed a small spring lever 27 whose pivot 28 journals in the members 25 and 26. The lever 27 is provided with a notch 29 adapted to receive the shouldered end of the burr.

The handle 30 of the lever 27 is of spring material and is adapted to latch itself upon the neck 31 of the hand piece, as is now common practice.

In the neck 31 is placed a shaft 32 which journals in the bearings 33 between which and integral with the shaft 32 is formed an enlarged portion 34 which acts as a collar between the bearings 33.

On opposite ends of the shaft 32 are formed the pinions 35 and 36, the former of which meshes with the pinion 20 and the latter meshes with the pinion 37 on the shaft 38, which journals in the bearing 39. The enlarged portions 40 and 41 on the shaft 38 insure against lateral movement and the perfect meshing of the pinions. A stem 42 projects from the end of the hand piece for the purpose of connecting same with a source of power.

In order to assemble this hand piece the half 11 is held in the hand and the shank 19 and the shafts 32 and 38 are laid in place. The half 10 with its portion 25 first hooked over the pivot 28, is now brought into the proper relation with the half 11. The members 15 and 17 are now screwed upon the opposite ends of the hand piece and it is ready for use.

It is preferable, of course, to place a very small quantity of oil, much less than is ordinarily employed for such tools, in the working parts of the device before assembly, and, as before stated, this is much less than is ordinarily required owing to the fact that all of it can be used for lubrication and does not come in contact with abrasives or foreign matter, since these cannot work their way into the working parts.

We are aware that hand pieces have long been constructed in the past; we therefore do not wish to cover this device broadly, but we do intend to cover all such forms and modifications thereof as fall fairly within the appended claim.

We claim:

In a hand piece, the combination of a split bent tubular frame having a cap screwed on each end thereof to hold the halves of said frame in a joined relation, each half of said frame having half bearings formed therein; meshing gears at the bend in said frame; shafts in said bearings carrying said gears; a gear at the outer end of one of said shafts; a geared burr-holding chuck rotatably mounted between the halves of said frame perpendicular to the shaft having a gear on its outer end and having the gear of said chuck meshing with the gear on said shaft; a burr-holding lever pivotally mounted between said halves of the frame adapted to lock same together at one point; and tongue and groove means for sealing the joints between the frame and halves.

WALTER R. JOHNSON.
ALFRED C. CANFIELD.